(12) United States Patent
Jakob

(10) Patent No.: US 10,082,191 B2
(45) Date of Patent: Sep. 25, 2018

(54) CLIPS FOR JOINTING DEVICES OF THE ENDS OF A CONVEYOR BELT

(71) Applicant: MLT Minet Lacing Technology, Saint-Chamond (FR)

(72) Inventor: Horst Jakob, Deaux (FR)

(73) Assignee: MLT Minet Lacing Technology, Saint-Chamond (FR)

( * ) Notice: Subject to any disclaimer, the term of this patent is extended or adjusted under 35 U.S.C. 154(b) by 0 days.

(21) Appl. No.: 15/835,601

(22) Filed: Dec. 8, 2017

(65) Prior Publication Data

US 2018/0100558 A1  Apr. 12, 2018

Related U.S. Application Data

(63) Continuation of application No. PCT/FR2016/051423, filed on Jun. 13, 2016.

(30) Foreign Application Priority Data

Jun. 25, 2015  (FR) .................................... 15 01342

(51) Int. Cl.
*B65G 17/00* (2006.01)
*F16G 3/04* (2006.01)
(Continued)

(52) U.S. Cl.
CPC ............... *F16G 3/04* (2013.01); *F16G 3/003* (2013.01); *F16G 3/16* (2013.01); *B65G 15/52* (2013.01); *B65G 47/82* (2013.01); *F16G 3/09* (2013.01)

(58) Field of Classification Search
CPC ....... F16G 3/02; Y10T 24/688; Y10T 24/1608; Y10T 24/162; Y10T 24/1612; B65G 47/82; B65G 47/844
(Continued)

(56) References Cited

U.S. PATENT DOCUMENTS 1,555,214 A * 9/1925 Johnson .................. B62D 1/16
                                             24/33 P
5,182,933 A * 2/1993 Schick ................... B21D 35/00
                                             24/33 B
(Continued)

FOREIGN PATENT DOCUMENTS

BE       368962    4/1930
FR      2701300    8/1994

OTHER PUBLICATIONS

International search report dated Oct. 7, 2016 in International Application No. PCT/FR2016/051423.

*Primary Examiner* — James R Bidwell
(74) *Attorney, Agent, or Firm* — Burris Law, PLLC

(57) ABSTRACT

The present disclosure provides a clip assembly for jointing devices for a conveyor belt that includes a U-shaped clip intended to be secured and straddling an end of a conveyor belt with an overhanging of a front curved portion, or nose of the clip. The clip assembly further includes a tube secured in a front concave portion of each clip and a bracket having two cheeks secured to lateral ends of the tube. The cheeks are joined together at a rear by a connection portion. The securing of the cheeks is obtained by piercings on lateral ends of the tube. Branches of the clips are provided with through-holes to secure the clip with a stem. In one form, the branches of one or more clips in a set of clips are of unequal length.

8 Claims, 6 Drawing Sheets

(51) Int. Cl.
*F16G 3/00* (2006.01)
*F16G 3/16* (2006.01)
*B65G 47/82* (2006.01)
*B65G 15/52* (2006.01)
*F16G 3/09* (2006.01)

(58) Field of Classification Search
USPC .................................... 198/844.2; 24/33 P
See application file for complete search history.

(56) References Cited

U.S. PATENT DOCUMENTS

| | | | | |
|---|---|---|---|---|
| 5,669,114 A | * | 9/1997 | Jakob | ................... F16G 3/04 |
| | | | | 198/844.2 |
| 2003/0150698 A1 | * | 8/2003 | Herold | ................... F16G 3/04 |
| | | | | 198/844.2 |

* cited by examiner

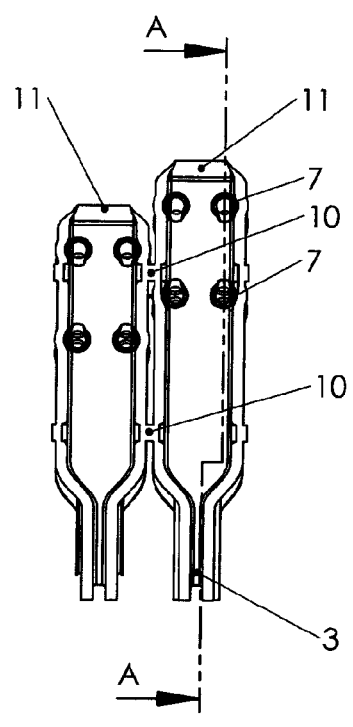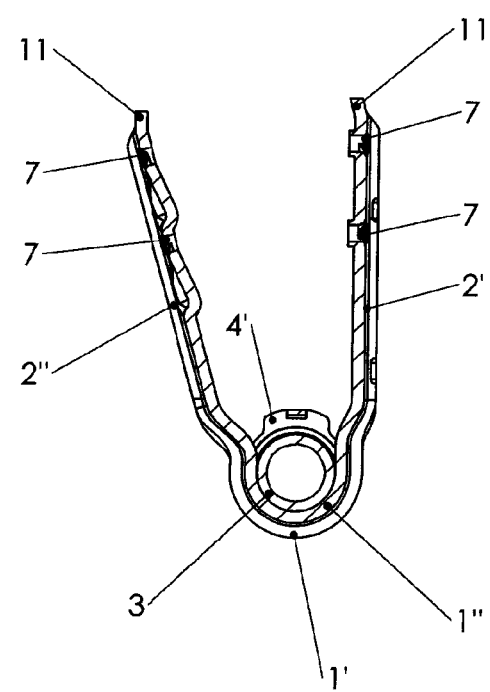
Fig. 4
Fig. 5

CLIPS FOR JOINTING DEVICES OF THE ENDS OF A CONVEYOR BELT

CROSS-REFERENCE TO RELATED APPLICATIONS

This application is a continuation of International Application No. PCT/FR2016/051423, filed on Jun. 13, 2016, which claims priority to and the benefit of FR 15/01342 filed on Jun. 25, 2015. The disclosures of the above applications are incorporated herein by reference.

FIELD

The present disclosure relates to clips intended for the creation of jointing devices of the hinge type, for conveyor belts.

BACKGROUND

The statements in this section merely provide background information related to the present disclosure and may not constitute prior art.

Clips secured in two rows straddling the ends of a conveyor belt that is to be connected, with overhanging of their curved front portion, or nose, have been known for a long time. Transverse French patent 2 701 300 shows such clips from the prior art. In the case of clips according to this prior patent, two particularities are described. The first resides in the fact that a ring is secured in the concave portion of the front curved portion of the clips. A hinge link rod is inserted into a ring belonging to a clip of a row of clips secured to one of the ends of the conveyor belt, then into a ring belonging to a clip of the other row of clips secured to the other end of the conveyor belt, and so on.

The second particularity of this patent resides in the fact that a sealing blade can be secured to the rear of the rings.

One of the issues arising with this type of clip, addressed in the document of prior art, consisted in that the rings are aligned parallel to the transverse edge of the end of the conveyor belt, at a distance from the edge of the ends of the conveyor belt equal for all of the clips so as to allow for the easy threading of the hinge link rod, it was necessary to ensure proper adjustment of the clips during the installation of the clips.

In the clips according to this document, this adjusting was obtained by the fact that the ring came to bear via its rear portion against the edge of the end of the conveyor belt in question, either directly, or indirectly by the intermediary of a sealing blade secured to the rear of the ring.

It was shown that this bearing on the rear of the rings did not isolate the rings from deformations due to the fact that the conveyor belts undergo during their operation traction forces and compression forces in the longitudinal direction. The jolts received by the conveyor belt were also passed onto the rear of the rings.

These deformations of the rings were unfavorable as they resulted in abnormal wear and tear of the hinge link rods. In addition, the clips secured to the ends of the conveyor belt were subjected because of this to tractions or thrusts that were transmitted by the means of securing with stem used for the securing of the clips and by this to the reinforcements of the ends of the conveyor belt wherein means for securing with a stem passed through.

This resulted in the pulling off of clips requiring repairs and because of this stoppage of the conveyor belts, which is detrimental to the output of the installations and expensive in terms of manpower.

Another disadvantage of known clips consisted in that the ends of the branches of fastening of the clips being aligned in the transverse direction (i.e. the direction perpendicular to the longitudinal direction defined hereinabove) these ends of the securing branches of the clips caused aligned bites that were very close to one another. These bites managed to join each other and to cause the appearance of lines of weakness. These lines of weakness caused serious deteriorations in the ends of the conveyor belt. These serious deteriorations could in turn even lead to causing breakdowns and stoppages of the conveyor belts.

SUMMARY

The present disclosure provides for decreased deformations of rings during the operation of conveyor belts and inhibits deteriorations caused by transversely-aligned bites caused by ends of securing branches of the clips, as well as by alignments in the transverse direction of perforations of ends of the conveyor belt whereon the clips are secured.

In order to inhibit deformations of the rings or tubes, the present disclosure provides a tube of a clip having a bracket comprising two cheeks and a connection portion connecting the two cheeks, with each one of the two cheeks being secured by its front portion to one of the respective lateral ends of the tube, with the dimension of the cheeks being such that their front portions secured to the tube can find a place, with the tube, in a front concave portion of the clip, their rear portions and connection portion being dimensioned in such a way that the edges of the rear portions of the cheeks, as well as the connection portion are located at least approximately in a common plane away from a rear portion of a periphery of the tube, with these edges of the rear portions of the cheeks and the connection portion being able, during the setting up and the securing of the clip, to be applied against the edge of the end of the conveyor belt in question.

The securing of the cheeks of the bracket on the tube can be carried out by piercings made in the front portion of each one of the cheeks of the bracket, with each one of these piercings being clamped onto one of the lateral ends of the tube, with the diameter of the piercings able, for this purpose, to be very slightly less than the outer diameter of the tube. This securing can be reinforced for a weld and the edges of the tube whereon the cheeks of the bracket are threaded can be folded back or riveted against a face.

As such the tubes are not subjected to the forces exerted primarily on the rear of the tubes but on the contrary, due to the fact that the brackets clamp the entire circular periphery of the two lateral ends of the tubes, the latter may not be ovalised or undergo another localised deformation.

The hitching that constitutes the end of the conveyor belt, the bracket, the tube, the front curved portion of the clip and the hinge link rod can as such operate mechanically, and thus, sustainably.

In order to overcome the bites aligned in the transverse direction, the present disclosure provides branches of a clip with a different length in the successive clips.

Pairs of clips of which the branches are of different length can be created by combining two clips by bridges of the material of the clips that connect it in the transverse direction. It is as such possible to connect several of such pairs of two clips of which the branches are of an unequal length in order to form assemblies of an even number of clips in order to facilitate manipulating them during the installation and securing on the end of the conveyor belt in question.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which:

FIG. 4 shows a plan view of a set of two clips connected together by bridges made in their own material according to the present disclosure;

FIG. 5 shows a cross-section of the clip assembly, taken along line A-A of FIG. 4;

Figure 1:
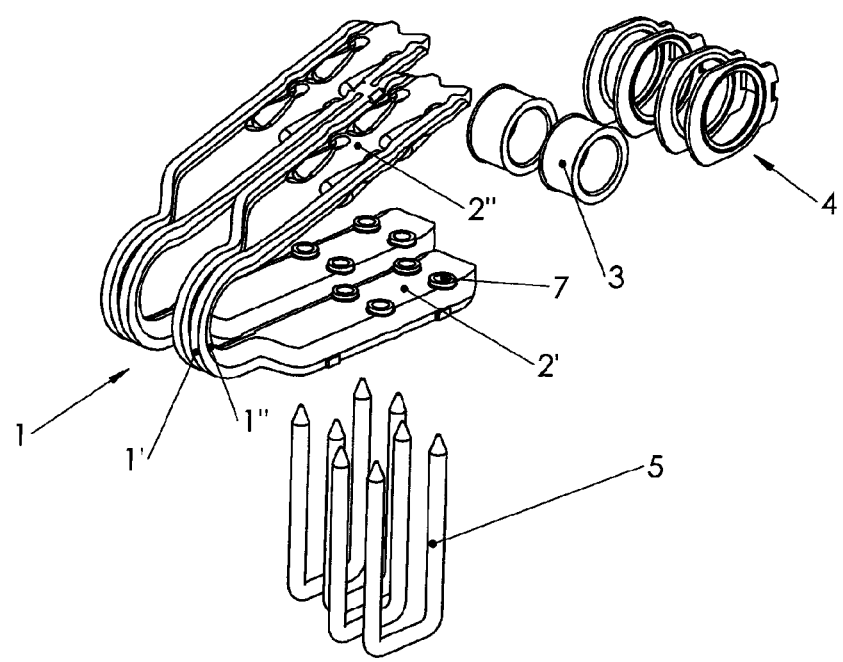
FIG. 1 shows an exploded view a clip assembly according to the present disclosure broken down into its different elements.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

As used hereinafter: "before" should be construed to mean a space towards the outside of the curved front portion, or nose, of the clips; "rear" should be construed to mean a space located in a direction of branches of clips used to secure the latter on an end of a conveyor belt; "longitudinal direction" should be construed to mean any direction parallel to a longitudinal direction of a conveyor belt whereon a clip is mounted; and "transverse direction" should be construed to mean any direction perpendicular to the longitudinal direction.

FIG. 1 shows a clip assembly according to the present disclosure with two open U-shaped clips 1, each U-shaped clip 1 having branches 2', 2", wherein each one of the branches 2', 2" comprises holes 7 intended for the passing of a device for securing with at least one stem 5, such as clamps shown under the clips 1. Tubes 3 and brackets 4 are intended to be assembled and mounted in a front concave portion 1" of the clips 1 as explained in the figures that follow. The clip assembly further includes a nose 1', or a front curved portion, as shown.

Figure 2:
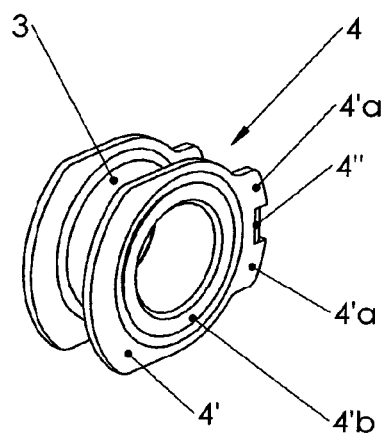
FIG. 2 shows a perspective view, seen three-quarters from a front, a bracket-tube subassembly of FIG. 1.

FIG. 2 shows a perspective view of a bracket 4 that comprises two cheeks 4' and a connection portion 4" that connects the two cheeks 4' by rear vertical portions 4'a of the connection portion 4", with each one of the two cheeks 4', 4' of the bracket 4 comprising a piercing 4'b wherein is inserted with clamping a tube 3. The edges of the tube 3 as such receiving the cheeks 4', 4' can be folded back, or riveted, against an external face of the cheeks 4', 4' of the bracket 4.

Figure 3:
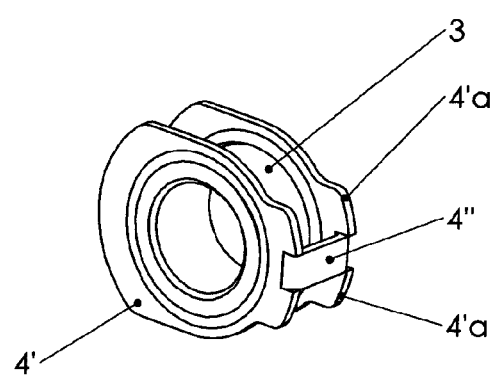
FIG. 3 shows a perspective view, seen three-quarters from a rear, a bracket-tube subassembly of FIG. 1.

FIG. 3 shows a perspective view of the same bracket 4 as FIG. 2 and the tube 3 seen this time at three-quarters from a rear. The same portions are recognized as in FIG. 2, bearing the same references.

FIG. 4 shows plan views from a bottom of the two clips 1 according to the present disclosure, connected together by bridges made from their own material. In one form, clips 1 are provided in the form of juxtaposed clips and connected together for the purpose of facilitating their positioning and their installation during the manufacture of jointing devices. The parts are recognized that were already described in relation with the preceding figures, bearing the same references, (branches 2', 2" of clips, tube 3, bracket 4, holes 7 for passing the means for securing with stems 5).

Also note that the two juxtaposed clips have branches 2' and 2" of different length. This particularity has a utility that shall be explained further on in liaison with FIG. 7.

FIG. 5, which shows a cross-section of the clip assembly according to the present disclosure, makes it possible to identify the portions already described in relation with the preceding figures (tube 3 as a cross-section, bracket 4, branches 2 of the clip 1, holes 7 for the passing for the stems 5 for the means for securing with a stem 5).

Figure 6:
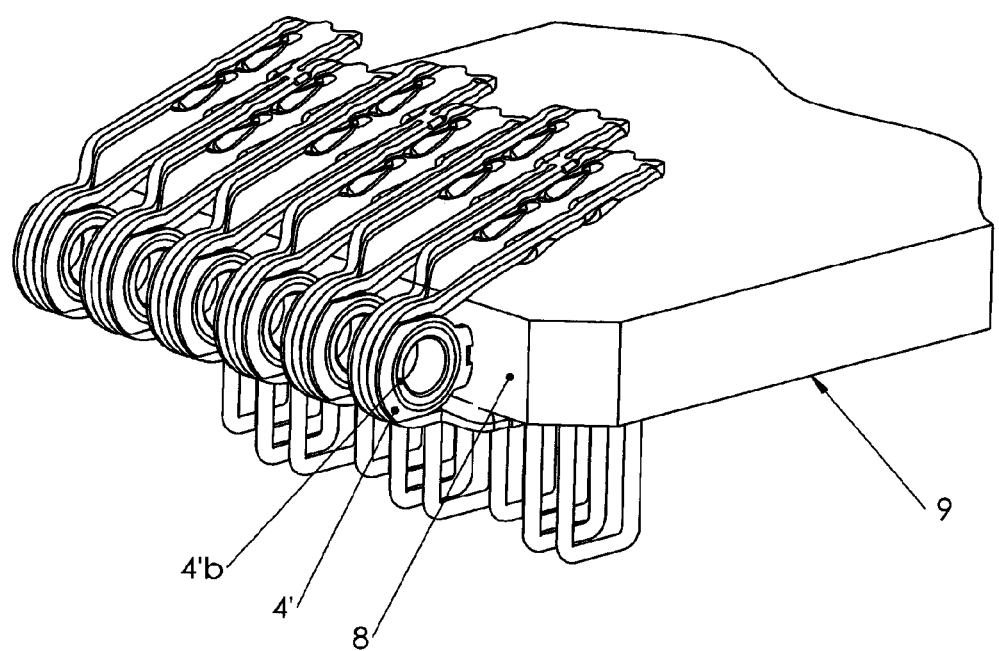
FIG. 6 shows perspective view of a set of 6 clips according to FIG. 4 ready to be closed and secured on an end of a conveyor belt.

FIG. 6, which shows a set of six clip assemblies ready to be secured making it possible to understand how rear vertical portions of the cheeks 4', 4' of the bracket 4 and the connection portion 4" of the bracket 4 of each clip assembly come into contact and bear against an edge 8 of an end 9 of a conveyor belt.

A precise geometry is as such established on each one of the clips 1 between the edge 8 of the end 9 of the conveyor belt and by an intermediary of the bracket-tube 3, 4 subassembly, the front concave portion 1" of the clip 1 wherein the bearing tube 3 of the bracket 4 is housed.

This geometrical precision was not obtained by the means known until now.

Thanks to the use of a bracket of which the rear portion located away from a periphery of the tube, the induced forces, during the operation of the conveyor belt, by the edge of the end of the conveyor belt are not exerted, as in prior art, directly on the rear portion of the periphery of the tube, causing therein an alteration in the circular shape, but over the entire periphery enclosed in the piercings 4'b of the cheeks 4', 4' of the bracket 4, which reduces deformation of the circular shape of the tube 3. This particularity explains that the clips and the hinge link rod are subjected to much less wear and tear, with the hinge operating in improved mechanical conditions.

This operation with high mechanical quality authorizes longevities without producing pulling off or breakdowns of the joints, much higher than those that the clips allowed for up until now.

Figure 7:
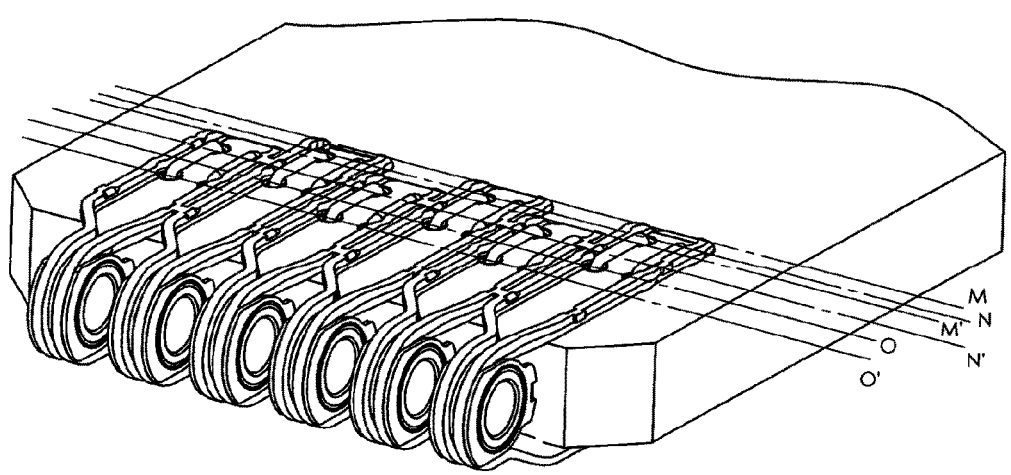
FIG. 7 shows the same set of 6 clips as that of FIG. 6 seen from another other side according to the present disclosure.

FIG. 7 shows the same set of clip assemblies according to the present disclosure as FIG. 6 seen from another other side, with the clip assemblies being secured. The same comments as for FIG. 6 can be made with regards to the precision of the mounting. In addition, this view makes it possible to understand the interest in having juxtaposed clips, whether or not connected to one another, having different lengths of branches 2', 2". In the example shown the lines for the transverse alignment of the passages have been plotted intended for the stems of the clamps. The holes made in the end of the conveyor belt are aligned on 4 lines N, N', O, O' but are separated in the transverse direction two times more than they would be in the case of branches of equal length secured in the same way with clamps with two branches. Of course, alternatives can be considered with other means of securing by stem with a single stem. But in any case, branches of unequal length make it possible to substantially decrease the proximity in the transverse direction of the holes made in the end of the conveyor belt, and because of this in its textile reinforcement.

It can also be noted in FIG. 7 that the stubs 11 of the branches of clips of unequal length are located on two transverse alignment lines M, M'. Due to the unequal length of the juxtaposed clip branches, the bites of these stubs 10 of clip branches cause in the material of the upper face (and of the lower face of the end of the conveyor belt) are located as such two times more apart from one another than they would be if the clips had branches of equal length, the risk that they come together during the operation of the belt is therefore substantially decreased. This also contributes to substantially improving the longevity of the operation without deteriorations of the joints obtained as such, or breakdowns.

Note that if it is renounced to use juxtaposed clips of which the branches are of unequal length, it is possible to use juxtaposed clips of which the branches are of equal length but of which the holes 7 of the passage of the device for securing with stem of a clip on two juxtaposed clips are offset in the longitudinal direction in relation to the holes for passing the device for securing with stem of the contiguous clip or of the contiguous clips.

As such are achieved the two purposes sought in order to improve known clips, i.e. very high dimensional precision of the bearings and of the connections allowing for a mechanical operation of high quality of the hinge as well as the decreased deteriorations of the stemming from the bites of the stubs of the branches of the clips excessively close to one another. The separation of the stems of the device for securing with a stem also obtained also participate in these results.

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A clip assembly for jointing devices of a hinge type for a conveyor belt, the clip assembly comprising:
    a U-shaped clip having a nose and branches extending from the nose, the U-shaped clip being configured to be positioned and straddling ends of the conveyor belt, with overhanging of the nose with respect to an edge of an end of the conveyor belt,
    wherein the clip assembly is configured to be placed in rows of clip assemblies arranged side by side on respective ends of the conveyor belt being nested one inside the other, with the nose of each clip assembly of one of the rows being dimensioned in such a way as to form a space between two neighbouring noses of clip assemblies of an adjacent clip assembly;
    a tube housed within the nose of the clip assembly; and
    a bracket comprising two cheeks and a connection portion that connects the two cheeks, each cheek having a rear portion, wherein the cheeks are secured to the tube with the rear portions and the connection portion being dimensioned in such a way that edges of the rear portions of the cheeks and the connection portion are located in a plane located away from a periphery of the tube, with the edges of the rear portions of the cheeks and the connection portion being configured to bear against the edge of the end of the conveyor belt.

2. The clip assembly according to claim 1, wherein the cheeks of the bracket are secured to the tube by a piercing made in a front portion of each one of the cheeks of the bracket, each piercing being clamped on at least one lateral end of the tube, wherein a diameter of each piercing is less than an outer diameter of the tube.

3. The clip assembly according to claim 2, wherein the cheeks of the bracket are secured to the tube by a weld.

4. The clip assembly according to claim 2, wherein edges of the tube are threaded and the cheeks of the bracket are folded back or riveted against an outer face of each one of the cheeks of the bracket.

5. The clip assembly according to claim 2, wherein the clip assemblies are connected laterally by bridges made in material of the U-shaped clips in such a way as to be juxtaposed side by side thereby constituting sets of clip assemblies of which the noses are aligned in a transverse direction.

6. The clip assembly according to claim 5, wherein each set of clip assemblies comprise at least two U-shaped clips.

7. The clip assembly according to claim 5, wherein the sets of juxtaposed clip assemblies of which the noses are aligned in the transverse direction, at least one U-shaped clip of each set of juxtaposed clip assemblies having branches that are shorter than at least one of the contiguous clip assemblies.

8. The clip assembly according to claim 5, wherein each U-shaped clip of the sets of juxtaposed clip assemblies of which the front portions are aligned in the transverse direction include holes for securing at least one stem, wherein the holes of at least one in two juxtaposed clip assemblies of the set of juxtaposed clip assemblies are offset in a longitudinal direction in relation to holes of at least one of the contiguous clip assemblies.

* * * * *